(12) United States Patent
Schillero, Jr.

(10) Patent No.: US 9,504,230 B1
(45) Date of Patent: Nov. 29, 2016

(54) PET CARRIER WITH LITTER TRAY

(71) Applicant: Joseph S. Schillero, Jr., Marysville, OH (US)

(72) Inventor: Joseph S. Schillero, Jr., Marysville, OH (US)

(*) Notice: Subject to any disclaimer, the term of this patent is extended or adjusted under 35 U.S.C. 154(b) by 85 days.

(21) Appl. No.: 14/660,999

(22) Filed: Mar. 18, 2015

Related U.S. Application Data

(60) Provisional application No. 61/979,211, filed on Apr. 14, 2014.

(51) Int. Cl.
*A01K 1/02* (2006.01)
*A01K 1/01* (2006.01)

(52) U.S. Cl.
CPC ............. *A01K 1/0236* (2013.01); *A01K 1/011* (2013.01); *A01K 1/0245* (2013.01)

(58) Field of Classification Search
CPC .. A01K 1/0236; A01K 1/0245; A01K 1/011; A01K 1/033; A01K 1/034
USPC .................................................. 119/479, 474
See application file for complete search history.

(56) References Cited

U.S. PATENT DOCUMENTS

| | | | |
|---|---|---|---|
| 3,742,909 A * | 7/1973 | Yellin | A01K 1/03 119/479 |
| 4,140,080 A * | 2/1979 | Snader | A01K 1/03 119/453 |
| 4,384,547 A * | 5/1983 | Mattox | A01K 31/06 119/464 |
| 4,527,512 A * | 7/1985 | Sugiura | A01K 1/0245 119/499 |
| 4,590,885 A * | 5/1986 | Sugiura | A01K 1/0245 119/497 |
| 5,054,426 A | 10/1991 | Panarelli et al. | |
| 5,148,768 A * | 9/1992 | Hinton | A01K 1/033 119/482 |
| 5,357,900 A * | 10/1994 | Ho | A01K 1/0245 119/479 |
| 5,671,697 A * | 9/1997 | Rutman | A01K 1/0245 119/472 |
| 5,713,302 A | 2/1998 | Walter | |
| 5,794,567 A * | 8/1998 | Itzhak | A01K 63/003 119/416 |
| 6,131,534 A * | 10/2000 | Axelrod | A01K 1/033 119/497 |
| 6,681,720 B1 * | 1/2004 | Skurdalsvold | A01K 1/03 119/461 |
| 7,021,243 B2 | 4/2006 | Harper et al. | |
| 7,228,820 B1 | 6/2007 | Kellogg et al. | |
| 7,681,532 B1 | 3/2010 | Deane | |
| 8,132,537 B2 | 3/2012 | Trunnell et al. | |
| D677,012 S | 2/2013 | Duvigneau | |
| 8,925,491 B2 * | 1/2015 | Glover | A01K 1/0245 119/453 |
| 2008/0264348 A1* | 10/2008 | Gere | A01K 1/03 119/479 |
| 2009/0114164 A1* | 5/2009 | Liu | A01K 31/06 119/475 |
| 2009/0205578 A1 | 8/2009 | Alves | |
| 2010/0282179 A1* | 11/2010 | Ho | A01K 31/06 119/455 |
| 2011/0226190 A1* | 9/2011 | Lamontagne | A01K 1/033 119/482 |
| 2014/0318469 A1* | 10/2014 | Beasley | A01K 1/0245 119/497 |
| 2016/0014992 A1* | 1/2016 | Link | A01K 1/015 119/416 |

FOREIGN PATENT DOCUMENTS

| | | |
|---|---|---|
| EP | 1400168 A1 | 3/2004 |
| WO | 2009024793 A1 | 2/2009 |

* cited by examiner

*Primary Examiner* — Monica Williams
(74) *Attorney, Agent, or Firm* — Robert C. Montgomery; Montgomery Patent & Design, LP.

(57) ABSTRACT

A pet carrier apparatus includes a main enclosure assembly, an extension assembly receivably connected to the main enclosure assembly, the extension assembly is movable relative to the main enclosure assembly to form a variable volume inner space, and a litter tray removably coupled to the extension assembly and extending within the inner space.

12 Claims, 5 Drawing Sheets

PET CARRIER WITH LITTER TRAY

RELATED APPLICATIONS

The present invention is a continuation-in-part of, was first described in, and claims the benefit of U.S. Provisional Application No. 61/979,211, filed Apr. 14, 2014, the entire disclosures of which are incorporated herein by reference.

FIELD OF THE INVENTION

The present invention relates generally to pet carriers and, more particularly, to a pet carrier having an expandable rear compartment enabling insertion and removal of a tray.

BACKGROUND OF THE INVENTION

Various pets such as dogs, cats, ferrets, and the like are frequently transported by the use of pet carriers or pet "taxis". Not only do these carriers make easy work of transporting the pet when required, but they also make great daily living quarters for the pet while away from home.

However, one (1) aspect of the pet's life that they do not provide for is when the pet needs to go to the bathroom. Should they be left free, they will most likely become lost in unfamiliar surroundings. Pets that are not accustomed to leashes are prone to fighting the leash, slipping out, and becoming lost as well.

While a separate litter box can be carried, they are large, bulky, and difficult to transport. Should the pet be forced to urinate or defecate in the carrier, it is a messy situation for the pet and owner alike.

Accordingly, there exists a need for a means by which a pet can be easily transported, but still be afforded the use of bathroom facilities in a manner that addresses the problems as described above.

SUMMARY OF THE INVENTION

The inventor has recognized the aforementioned inherent problems and lack in the art and observed that there is a need for a pet carrier that provides for both the functionality and convenience of a pet carrier and an enclosed litter box. The development of the present invention, which will be described in greater detail herein, substantially departs from conventional solutions to fulfill this need.

In one (1) embodiment, the disclosed pet carrier apparatus includes a main enclosure assembly, an extension assembly receivably connected to the main enclosure assembly, the extension assembly is movable relative to the main enclosure assembly to form a variable volume inner space, and a litter tray removably coupled to the extension assembly and extending within the inner space.

In another embodiment, the disclosed pet carrier apparatus includes a main enclosure assembly including a main top panel, a main floor panel, a first main side panel, a second main side panel, an open first main end, and an open second main end defining a main enclosure inner space. The disclosed pet carrier apparatus further includes an extension assembly including an extension top panel, an extension floor panel, a first extension side panel, a second extension side panel, an extension end panel, and an open second extension end defining an extension inner space. The disclosed pet carrier apparatus further includes a litter tray insertably connected to the extension assembly through the extension end panel and extending within the extension inner space. The main enclosure second end is received within the extension assembly second end. The extension assembly is movable relative to the main enclosure assembly.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
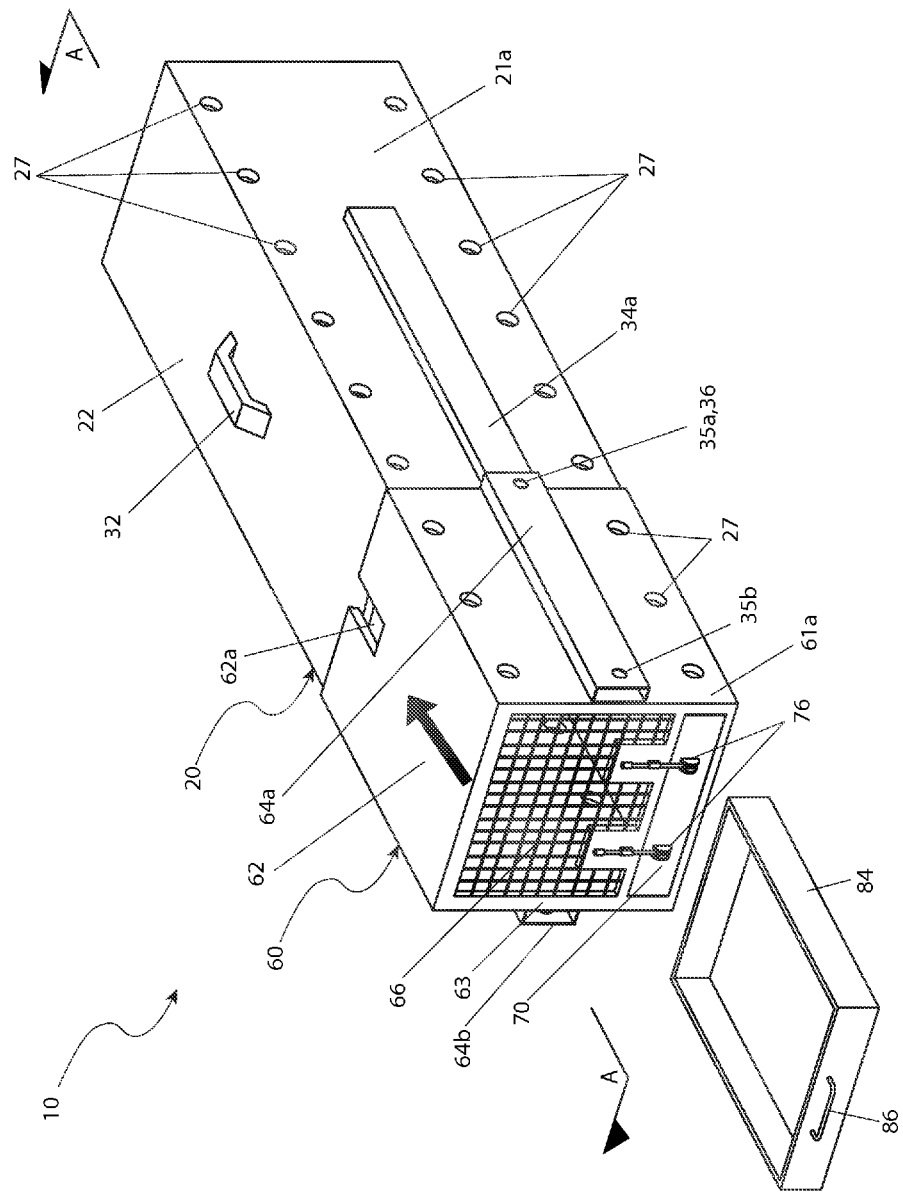
FIG. 1 is a side perspective view of a pet carrier, depicted in a fully extended state, according to one embodiment of the present invention.

DESCRIPTIVE KEY 10 pet carrier
20 main enclosure assembly
21a first main side panel
21b second main side panel
22 main top panel
23 main door frame
24 main floor panel
25 main enclosure inner space
27 vent aperture
29 pet door
30 latch
31 door hinge
32 handle
34a first inner slide
34b second inner slide
35a front button aperture
35b rear button aperture
36 spring button
60 extension assembly
61a first extension side panel
61b second extension side panel
62 extension top panel
62a handle slot
63 extension end panel
64a first outer slide
64b second outer slide
65 extension inner space
66 window
67 extension floor panel 70 tray door
71 curved surface
73 hinge rod
74 spring
76 slide bolt
77 knob
79a first guide
79b second guide
80 door opening
82 runner
84 litter tray
86 tray handle
100 litter

DETAILED DESCRIPTION OF THE PREFERRED EMBODIMENT

In accordance with the invention, the best mode is presented in terms of a one or more of the disclosed embodiments, herein depicted within FIGS. 1 through 5. However, the disclosure is not limited to a single described embodiment and a person skilled in the art will appreciate that many other embodiments are possible without deviating from the basic concept of the disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

As used herein, the terms "first", "second", "third", etc. are used as labels to describe various elements, features, and/or components, and are not intended to impose ordinal, positional, or hierarchical requirements on the referenced items, unless other indicated. For example, such terms may be used to distinguish one (1) element from another element.

As used herein, relative terms such as "front", "rear", "left", "right", "top", "bottom", "below", "above", "upper", "lower", "horizontal", or "vertical" are used to describe a relationship of one (1) element, feature and/or region to another element, feature and/or region as illustrated in the figures.

Referring to FIGS. 1-5, disclosing a pet carrier apparatus (herein described as the "apparatus") 10, where like reference numerals represent similar or like parts. Generally, the disclosed apparatus 10 includes a pet carrier having dual expanding compartments 20, 60 that allow for normal transport and a configurable litter tray.

Figure 2:
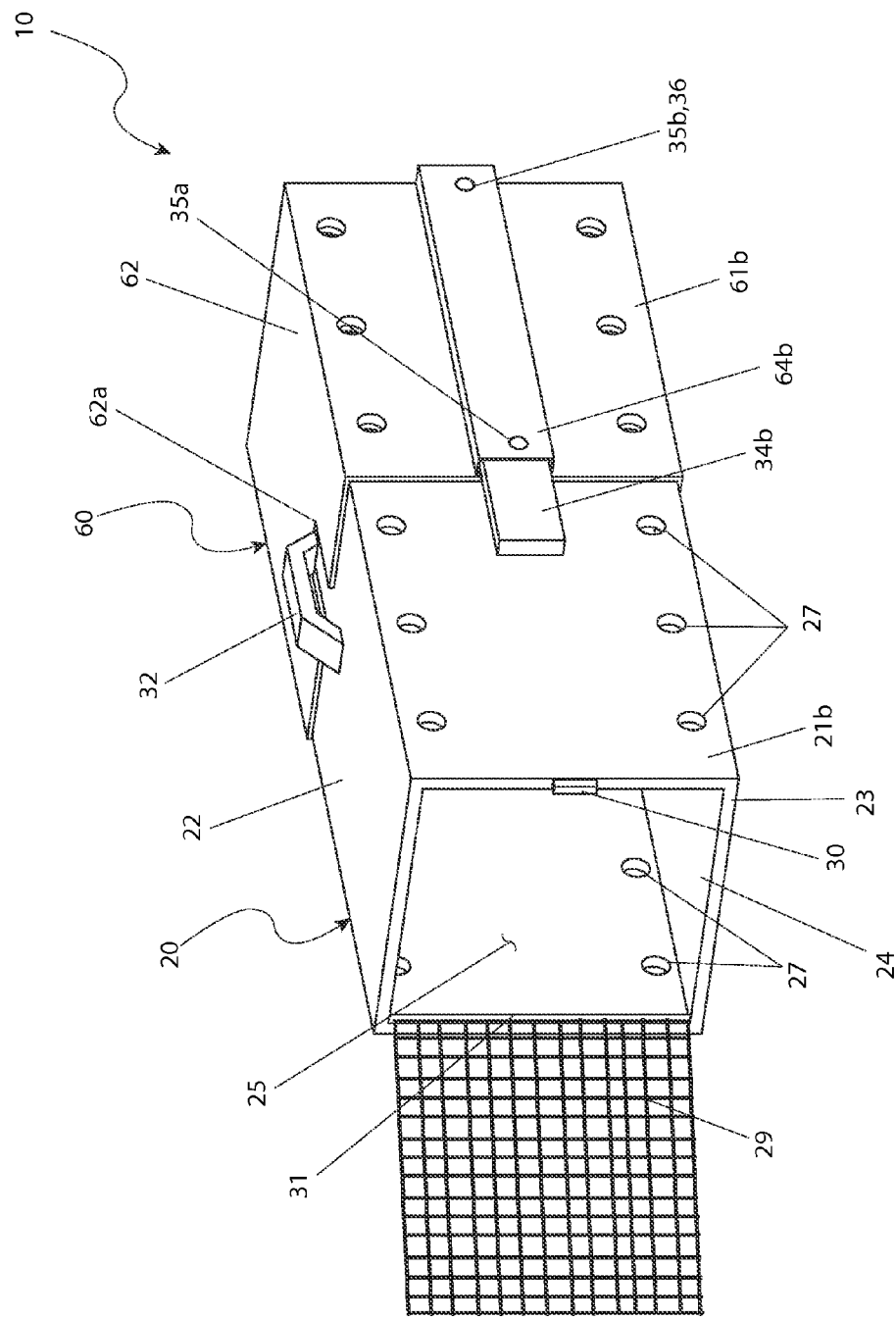
FIG. 2 is an opposing side perspective view of the pet carrier of FIG. 1, depicted in a fully retracted state, according to one embodiment of the present invention.
Figure 3:
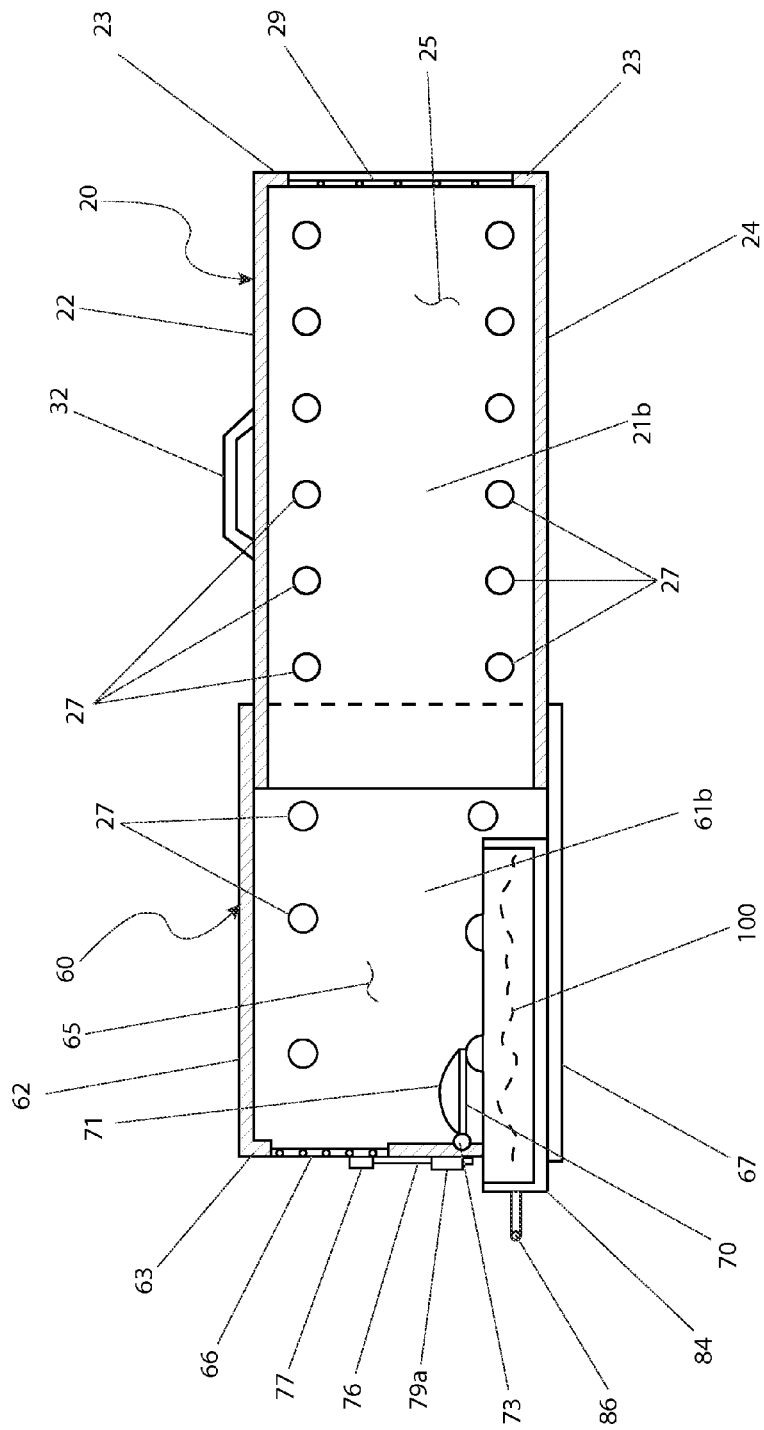
FIG. 3 is a sectional side view of the pet carrier taken along section line A-A of FIG. 1, according to one embodiment of the present invention.

Referring to FIGS. 1, 2, and 3, the apparatus 10 includes a main enclosure assembly 20 having a slidingly attached extension assembly 60. The main enclosure assembly 20 and extension assembly 60 are hollow structures defining an interior volume capable of housing a small animal (e.g., a pet). In one (1) example construction, the main enclosure assembly 20 and extension assembly 60 can be made of plastic. In another example construction, the main enclosure assembly 20 and extension assembly 60 each include generally rectangular cross-sectional shapes. The main enclosure assembly 20 is slightly undersized to allow telescoping insertion into the extension assembly 60.

Those skilled in the art will recognize that the apparatus 10 can be introduced in various sizes based upon a space required by an intended pet to be transported and in various colors and/or patterns based upon a user's preferences, without limitation.

The main enclosure assembly 20 includes a main enclosure inner space 25 defined by (e.g., molded or extruded plastic) a first side panel 21a, an opposing second side panel 21b, a top panel 22, a floor panel 24, and a main door frame 23. The main door frame 23 provides attachment of a pet door 29. The first side panel 21a and second side panel 21b each have a plurality of vent apertures 27 (e.g., molded) therethrough and designed to provide fresh air to an occupying pet. The top panel 22 include an (e.g., integrally-molded or otherwise connected) "U"-shaped handle 32 centered upon the top panel 22 to provide easy lifting and transport of the apparatus 10 and included pet. The main door frame 23 extends around perimeter edges of a forward-facing surface and provides hinged attachment of a molded plastic grid or welded wire (e.g., "see-through") pet door 29.

The pet door 29 swings open to provide convenient loading and unloading of the pet and further includes a securing latch 30 along one (1) vertical edge of the main door frame 23, and a door hinge 31 along an opposite vertical edge of the main door frame 23.

The first 21a and second 21b side panels each include integral mirror-image first inner slide 34a and second inner slide 34b, respectively, arranged along outer surfaces in a parallel manner. The inner slides 34a, 34b include linear horizontal protrusions that are slidingly motioned within corresponding and matching channel-shaped first outer slide 64a and second outer slide 64b of the extension assembly 60.

In a similar manner, the extension assembly 60 includes a five-sided (e.g., rectangular) structure including an extension inner space 65 defined by a first extension side panel 61a, a second extension side panel 61b, an extension top panel 62, an extension end panel 63, and an extension floor panel 67. The opposing and parallel first 61a and second 61b extension side panels include the integral first outer slide 64a and second outer slide 64b. The extension top panel 62 includes a handle slot 62a along a forward edge that provides clearance for the handle 32 of the main enclosure assembly 20 during times when the apparatus 10 is in a collapsed state, as best illustrated in FIG. 2.

Each inner slide 34a, 34b provides a means to lock the extension assembly 60 in either its extended state (FIG. 1) or its collapsed (e.g., overlapping) state (FIG. 2) via a spring button 36. The spring button 36 engages one (1) of corresponding integral front button aperture 35a or rear button aperture 35b of each outer slide 64a, 64b, respectively. In one (1) example construction, each spring button 36 can be a round-nose spring-loaded device that provides similar function and construction as those used with awnings and telescoping tubular poles. Each spring button 36 engages the correspondingly sized and positioned button aperture 35a, 35b of the outer slides 64a, 64b to secure the apparatus 10 in a desired state.

The slides 34a, 34b, 64a, 64b act to linearly guide and lock the extension assembly 60 with respect to the main enclosure assembly 20 as it is extended to reconfigure the apparatus 10, thereby providing additional space necessary for the pet to perform its toilet duties.

Figure 4:
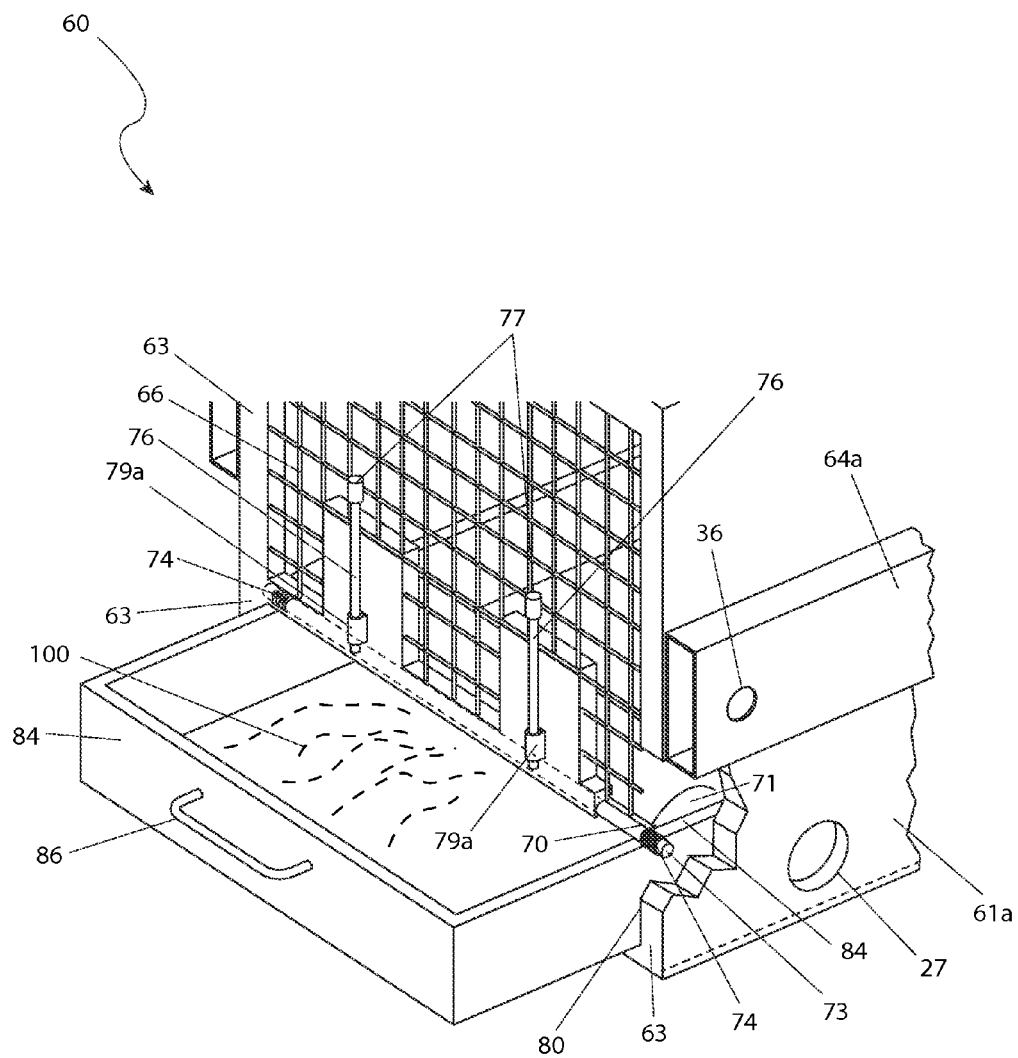
FIG. 4 is a partial view of an extension assembly of the pet carrier, depicting installation of a litter tray, according to one embodiment of the present invention; and, FIG. 5 is a partial view of a tray door of the pet carrier, depicted in a closed state, according to one embodiment of the present invention.
Figure 5:
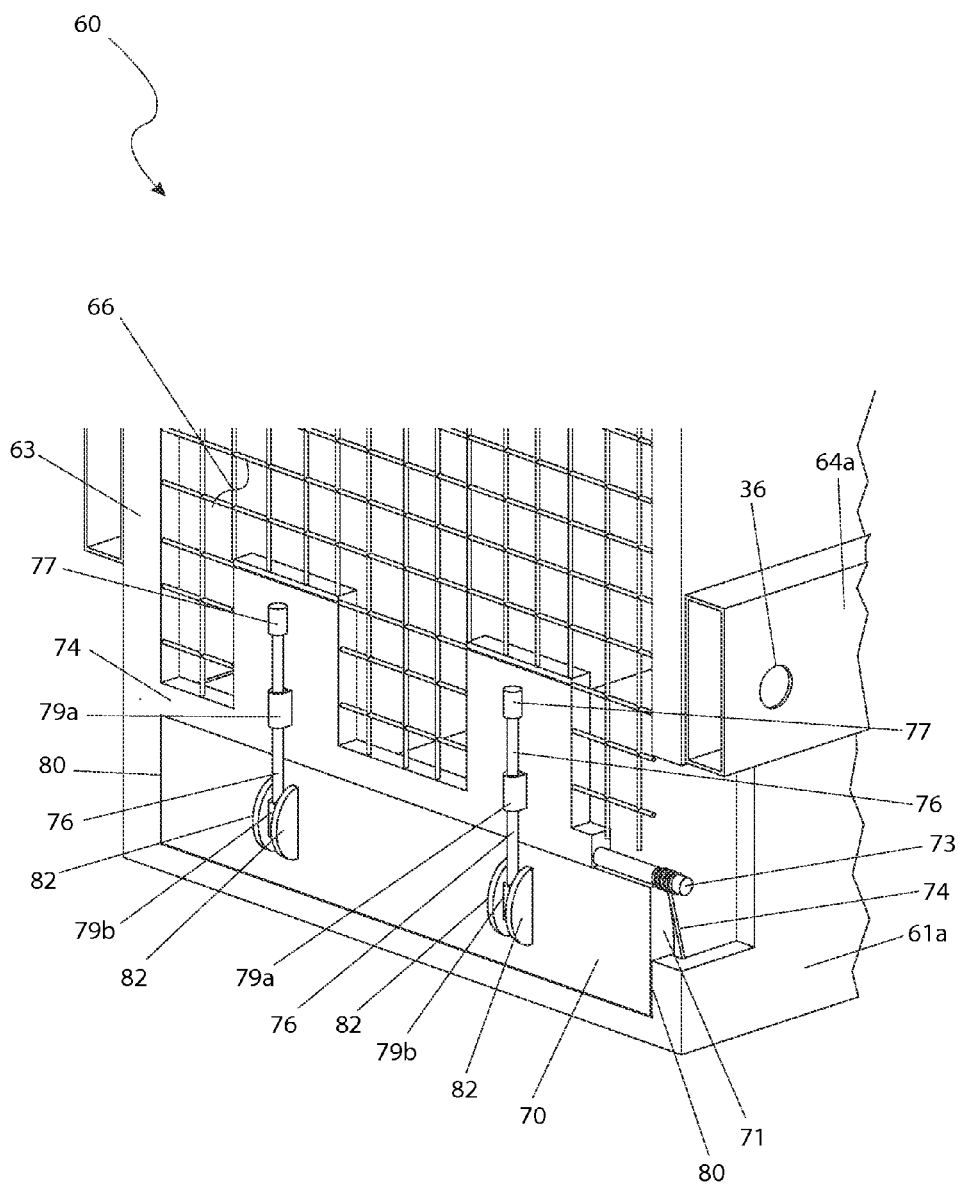

When in the extended state (FIGS. 1 and 3), a rectangular litter tray 84 may be inserted into the extension assembly 60 through a spring-loaded tray door 70 (FIGS. 4 and 5).

Referring to FIGS. 4 and 5, the apparatus 10 includes the lockable and spring-loaded tray door 70 that provides a means whereby a pet may perform toilet duties without being removed from the apparatus 10. The tray door 70 facilitates external insertion, utilization, and removal of the litter tray 84. The tray door 70 is located along a bottom portion of the extension end panel 63 and further includes a hinge rod 73 and a pair of locking slide bolts 76. The tray door 70 includes a rectangular shape being slightly larger than a front surface of the litter tray 84, and covers a correspondingly shaped door opening 80 of the extension end panel 63. The hinge rod 73 is integrated into a top edge portion of the tray door 70 extending a length of the tray door 70, being partially inserted into and rotatingly supported by the first 61a and second 61b side panels of the extension assembly 60. The hinge rod 73 has a pair of encompassing torsion springs 74, one (1) mounted to each outer end. The springs 74 act to bias the tray door 70 downwardly to a closed state, as best illustrated in FIG. 5. The tray door 70 includes a rear curved surface 71 (FIG. 3) designed to discourage a pet from digging at the tray door 70 when in the closed state.

When not in use, the tray door 70 may be locked in a vertical closed position via the pair of slide bolts 76 being slidingly connected to the extension end panel 63 of the extension assembly 60 via respective integrally-molded semi-circular tunnel-shaped first guides 79a. The tray door 70 is locked in its closed position by grasping integral knobs 77 located at a top end of each slide bolt 76, and motioning the slide bolts 76 downwardly within the first guides 79a. Bottom ends of each slide bolt 76 then engage respective second guides 79b, for example, which are molded into the outer surface of the tray door 70 and vertically aligned with each slide bolt 76. The second guides 79b provide a similar shape as the first guides 79a to receive the slide bolts 76.

Also molded into the tray door 70 are a plurality of arcuate runners 82 that provide gently curved contact surfaces enabling the litter tray 84 to smoothly engage, thereby preventing any possible interference while inserting the litter tray 84 through the door opening 80.

Those skilled in the art will recognize that other styles and configurations of the disclosed apparatus 10 can be easily incorporated into the teachings of the present disclosure, and only particular configurations have been shown and described for purposes of clarity and disclosure and not by way of limitation of scope.

The example embodiments of the present invention can be utilized by the user in a simple and effortless manner with little or no training. After initial purchase or acquisition of the apparatus 10, it would be installed as indicated in FIGS. 1-5.

The method of installing and utilizing the apparatus 10 may be achieved by performing the following steps: procuring a model of the apparatus 10 suitable to transport a particularly sized pet; locking the extension assembly 60 in its collapsed state by inserting the main enclosure assembly 20 into the extension assembly 60 until the spring buttons 36 of the main enclosure assembly 20 engage the corresponding rear button apertures 35b of the extension assembly 60; loading a pet into the main enclosure assembly 20 through the pet door 29 by detaching the latch 30 and opening the pet door 29; placing the pet into the main enclosure assembly 20 through the pet door 29; closing the pet door 29 and reattaching the latch 30; transporting the pet using the handle 32 until the pet needs to perform toilet duties; placing the apparatus 10 upon a flat surface; deploying the extension assembly 60 outwardly by pressing inwardly upon the opposing spring buttons 36; pulling the extension assembly 60 away from the main enclosure assembly 20 until the pair of spring buttons 36 engage the corresponding front button apertures 35a; preparing the litter tray 84 by filling it with a desired quantity of litter 100; unlocking the tray door 70 by grasping the knobs 77 and lifting the slide bolts 76 upwardly; opening the tray door 70 by grasping the tray handle 86 and pressing a forward edge of the liter tray 84 against the tray door 70; inserting the litter tray 84 a desired distance through the door opening 80; allowing a period of time for the pet to urinate and/or defecate onto the litter 100 contained within the litter tray 70; allowing the pet to return to the main enclosure inner space 25 of the main enclosure assembly 20; withdrawing the liter tray 84 out of the door opening 80 using the tray handle 86; allowing the spring-action of the hinge rod 73 to close the tray door 70 against the door opening 80; locking the tray door 70 in a closed state by grasping the knobs 77 and motioning the slide bolts 76 downward until they engage the second guides 79b of the tray door 70; collapsing the extension assembly 60 over the main enclosure 20 by pressing inwardly upon the opposing spring buttons 36; pushing the extension assembly 60 over the main enclosure assembly 20 until the pair of spring buttons 36 engage the corresponding front button apertures 35a; continuing to use the apparatus 10 for normal transport of the pet; and, benefiting from a convenient and secure means of providing toilet facilities to a confined pet, afforded a user of the disclosed apparatus 10.

The apparatus 10 may also be used within a user's home, during travel within a motor vehicle, while on vacation, camping, or similar ventures away from home.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A pet carrier apparatus comprising:
   a main enclosure assembly;
   an extension assembly receivably connected to said main enclosure assembly, said extension assembly is movable relative to said main enclosure assembly to form a variable volume inner space;
   a litter tray removably coupled to said extension assembly and extending within said inner space;
   wherein said main enclosure assembly comprises: a first end comprising a main door frame; a second end opposite said first end; and, a door hingedly connected to said main door frame;
   wherein said extension assembly comprises: a first end comprising a tray door opening; a second end opposite said first end; and, a tray door hingedly connected to said first end and covering said tray door opening;
   wherein said second end of said main enclosure is received within said second end of said extension assembly; and,
   wherein said tray door pivots inwardly within said inner space.

2. The apparatus of claim 1, wherein said extension assembly comprises a pair of opposed inner slides, wherein said main enclosure assembly comprises a pair of opposed outer slides, and wherein said inner slides are received and slide within said outer slides.

3. The apparatus of claim 2, wherein said inner slides comprise a spring button, wherein said outer slides comprise button apertures, and wherein said spring button engages selected button apertures to secure said extension assembly relative to said main enclosure assembly.

4. The apparatus of claim 1, wherein said tray door is biased in a closed position.

5. The apparatus of claim 1, wherein said tray door comprises a curved rear surface.

6. The apparatus of claim 1, wherein said litter tray is received by said tray door opening.

7. The apparatus of claim 1, wherein said extension assembly further comprises a slide bolt removably connected to said tray door.

8. The apparatus of claim 1, wherein said second end of said extension assembly comprises a window.

9. The apparatus of claim 1, wherein said main enclosure assembly comprises a handle, and wherein said extension assembly comprises a handle slot configured to receive said handle.

10. A pet carrier apparatus comprising:
a main enclosure assembly comprising a main top panel, a main floor panel, a first main side panel, a second main side panel, an open first main end, and an open second main end defining a main enclosure inner space;
an extension assembly comprising an extension top panel, an extension floor panel, a first extension side panel, a second extension side panel, an extension end panel, and an open second extension end defining an extension inner space;
a litter tray insertably connected to said extension assembly through said extension end panel and extending within said extension inner space,
wherein said main enclosure second end is received within said extension assembly second end;
wherein said extension assembly is movable relative to said main enclosure assembly;
wherein said first extension side panel and said second extension side panel each comprises an outwardly protruding inner slide, wherein said first main side panel and said second main side panel each comprises a recessed outer slide, and wherein inner slide is received and slides within said outer slide;
wherein said inner slide comprise a spring button, wherein said outer slide comprise a plurality of button apertures, and wherein said spring button engages a selected button aperture of said plurality of button apertures to secure said extension assembly relative to said main enclosure assembly;
wherein said main enclosure assembly further comprises: a main door frame at said first end of said main enclosure assembly; a door hingedly connected to said main door frame; and, a latch connected to said main door frame and releasably connected to said door;
wherein said extension assembly comprises: a tray door opening disposed through said extension end panel; a tray door hingedly connected to said extension end panel and covering said tray door opening; wherein said litter tray is received by said tray door opening; and,
wherein said tray door opens inwardly within said extension inner space, and wherein said tray door is biased in a closed position.

11. The apparatus of claim 10, wherein said extension assembly further comprises a slide bolt removably connected to said tray door.

12. The apparatus of claim 11, wherein said main enclosure assembly comprises a handle connected to said main top panel, and wherein said extension assembly comprises a handle slot disposed in said extension top panel and configured to receive said handle.

* * * * *